US012783483B1

(12) United States Patent
Yadlapalli

(10) Patent No.: US 12,783,483 B1
(45) Date of Patent: Nov. 3, 2026

(54) SYSTEMS AND METHODS FOR DOCUMENT INGESTION, QUERY PROCESSING AND/OR PRE-PROCESSING FOR EFFICIENT INFORMATION RETRIEVAL, SUCH AS USING PHONETIC SEQUENCE FREQUENCY ANALYSIS TO AUGMENT LANGUAGE MODELS

(71) Applicant: Humana Inc., Louisville, KY (US)

(72) Inventor: Pavankumar Yadlapalli, Louisville, KY (US)

(73) Assignee: Humana Inc., Louisville, KY (US)

( * ) Notice: Subject to any disclaimer, the term of this patent is extended or adjusted under 35 U.S.C. 154(b) by 0 days.

(21) Appl. No.: 19/033,752

(22) Filed: Jan. 22, 2025

(51) Int. Cl.
*G06F 16/00* (2019.01)
*G06F 16/22* (2019.01)
*G06F 16/2457* (2019.01)

(52) U.S. Cl.
CPC ........ *G06F 16/22* (2019.01); *G06F 16/24575* (2019.01)

(58) Field of Classification Search
CPC ........................... G06F 16/22; G06F 16/24575
See application file for complete search history.

(56) References Cited

U.S. PATENT DOCUMENTS

| | | | | |
|---|---|---|---|---|
| 7,310,600 | B1 * | 12/2007 | Garner | G10L 15/12 704/239 |
| 2012/0233631 | A1 * | 9/2012 | Geshwind | H04N 21/44016 725/35 |
| 2015/0254233 | A1 * | 9/2015 | Artzi | G06F 40/216 704/9 |
| 2016/0035234 | A1 * | 2/2016 | Choi | G09B 5/02 434/323 |
| 2016/0275945 | A1 * | 9/2016 | Elisha | G06F 16/638 |
| 2021/0174372 | A1 * | 6/2021 | Jadhav | H04L 51/04 |
| 2022/0310076 | A1 * | 9/2022 | Kumar | G10L 15/1822 |
| 2024/0412011 | A1 * | 12/2024 | Hoang | G06F 40/58 |

FOREIGN PATENT DOCUMENTS

| | | | | |
|---|---|---|---|---|
| KR | 20250091993 A | * | 6/2025 | G06F 17/153 |

* cited by examiner

*Primary Examiner* — Dinku W Gebresenbet
(74) *Attorney, Agent, or Firm* — Standley Law Group LLP; Jeffrey S. Standley; Adam J. Smith

(57) ABSTRACT

Systems and methods for document ingestion, query processing and/or pre-processing for efficient information retrieval, such as using phonetic sequency frequency ("PSF") analysis to augment language models are disclosed. A phonetic indexing subroutine is performed for received documents to generate indexed documents forming a knowledge database. User queries are received. The phonetic indexing subroutine is performed for each query to generate a respective indexed query. A PSF comparison analysis is performed for each query against some or all of the indexed documents in the knowledge database based, at least in part, on a phonetic sequence and frequency comparison between each phonetic word in the respective indexed query and phonetic words in the compared documents.

15 Claims, 5 Drawing Sheets

SYSTEMS AND METHODS FOR DOCUMENT INGESTION, QUERY PROCESSING AND/OR PRE-PROCESSING FOR EFFICIENT INFORMATION RETRIEVAL, SUCH AS USING PHONETIC SEQUENCE FREQUENCY ANALYSIS TO AUGMENT LANGUAGE MODELS

CROSS-REFERENCE TO RELATED APPLICATIONS

This application is filed as original and makes no priority claim.

TECHNICAL FIELD

The present invention relates generally to the field of natural language processing (NLP) and information retrieval. More specifically, the present invention concerns systems and methods for document ingestion, query processing and/or pre-processing for efficient information retrieval, such as using phonetic sequence frequency (PSF) analysis to augment language models in exemplary embodiments.

BACKGROUND AND SUMMARY OF THE INVENTION

Traditional language model technologies primarily rely on large-scale data models to process and understand natural language. These models, often referred to as Large Language Models (LLMs), are typically trained on extensive corpuses of text data and are capable of generating human-like text based on the input they receive. The effectiveness of these models largely depends on the volume and quality of the data on which they are trained.

Retrieval-Augmented Generation (RAG) represents a significant advancement in the field of NLP, wherein external data is dynamically retrieved and used to augment the responses generated by LLMs. This approach typically employs vector embeddings to search and retrieve relevant information based on the input query. However, this method is computationally intensive and often requires substantial hardware resources, which can be costly.

Despite the advancements, there remain inefficiencies in traditional RAG methodologies, such as due to the reliance on embedding models and the extensive computational resources they require. Additionally, the vector embedding techniques used for information retrieval may not always capture the nuances of language, such as phonetic variations, which can be crucial for understanding and processing languages with high phonetic diversity.

This traditional RAG method often overlooks crucial aspects such as access controls and user-specific data retrieval preferences, which are essential for applications requiring privacy, compliance with data governance policies, or customized content delivery.

A need exists for an improved query processing and information retrieval that not only reduces the computational load and associated costs but also enhances the accuracy and efficiency of language models. Particularly, a need exists for a system that can effectively handle phonetic variations in language, enabling more precise and contextually relevant responses from LLMs. This is especially critical for applications involving languages with non-standard spelling conventions or significant dialectical variations, by way of example.

The present disclosures address these and other issues, such as by providing a phonetic sequence frequency (PSF) analysis for query processing and information retrieval. By focusing on phonetic sequences rather than traditional vector embeddings, the disclosed systems and methods more accurately reflect the phonetic characteristics of the input language, leading to more relevant data retrieval, and consequently, more accurate and contextually appropriate responses from the language model. This technique also allows for the use of smaller, more efficient models (e.g., models trained on relatively smaller corpuses of data, sometimes referred to herein as "small language models" or "SLMs"), thereby reducing operational costs and improving the scalability of language processing systems.

The proposed system and method signify a notable improvement over existing technologies by optimizing the efficiency and accuracy of language models using phonetic sequence frequency. This approach not only meets the growing demands for cost-effective language processing solutions but also enhances the capability of language models to handle a diverse array of linguistic inputs effectively.

The disclosed systems and methods may be configured to restrict querying users' access to documents tagged with an intended audience matching that of the querying user. Alternatively, or additionally, access may be controlled by topic as described, such as without the need for a separate audience tag, such as to help with data governance. For example, certain users may be permitted access to only documents of one or more of the available topics. These features may provide access control to information and/or may focus a query, such as to generate a "closed universe" of data utilized in response to the query. In exemplary embodiments, without limitation, the PSF analysis and/or tagging techniques may be utilized to construct a closed universe of information (e.g., data and/or documents; sometimes referred to herein generally as "documents", though the information may take various forms) and/or a relevancy ranking, thereby generating a relatively smaller corpus of data to be analyzed by the model, thereby effectively allowing use of SLMs. This closed universe approach may be utilized independent of the PSF analysis and/or tagging techniques in other exemplary embodiments.

These disclosures include computer-implemented systems and methods for query processing and/or pre-processing for efficient information retrieval, such as using PSF analysis, such as to augment language models. In exemplary embodiments, without limitation, documents are received from users to build a knowledge database and are tagged with metadata indicating intended audience and topic, enabling a tailored responses to user queries. This access restriction is enforced by the data ingestion and indexing system, which filters the accessible content based on the user's permission level and the relevance of the content to the query, considering both the phonetic sequence of the query and its semantic context. By focusing on the most pertinent documents and leveraging phonetic sequence frequency for search optimization, the system significantly reduces the computational load on the language models. This results in faster response times and increased accuracy, while also minimizing operational costs by allowing the use of smaller, more efficient models. The described method is particularly advantageous in environments requiring stringent data security and personalized data access, providing an innovative solution that balances efficiency with robust access control mechanisms.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical, similar, or equivalent features, and wherein.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
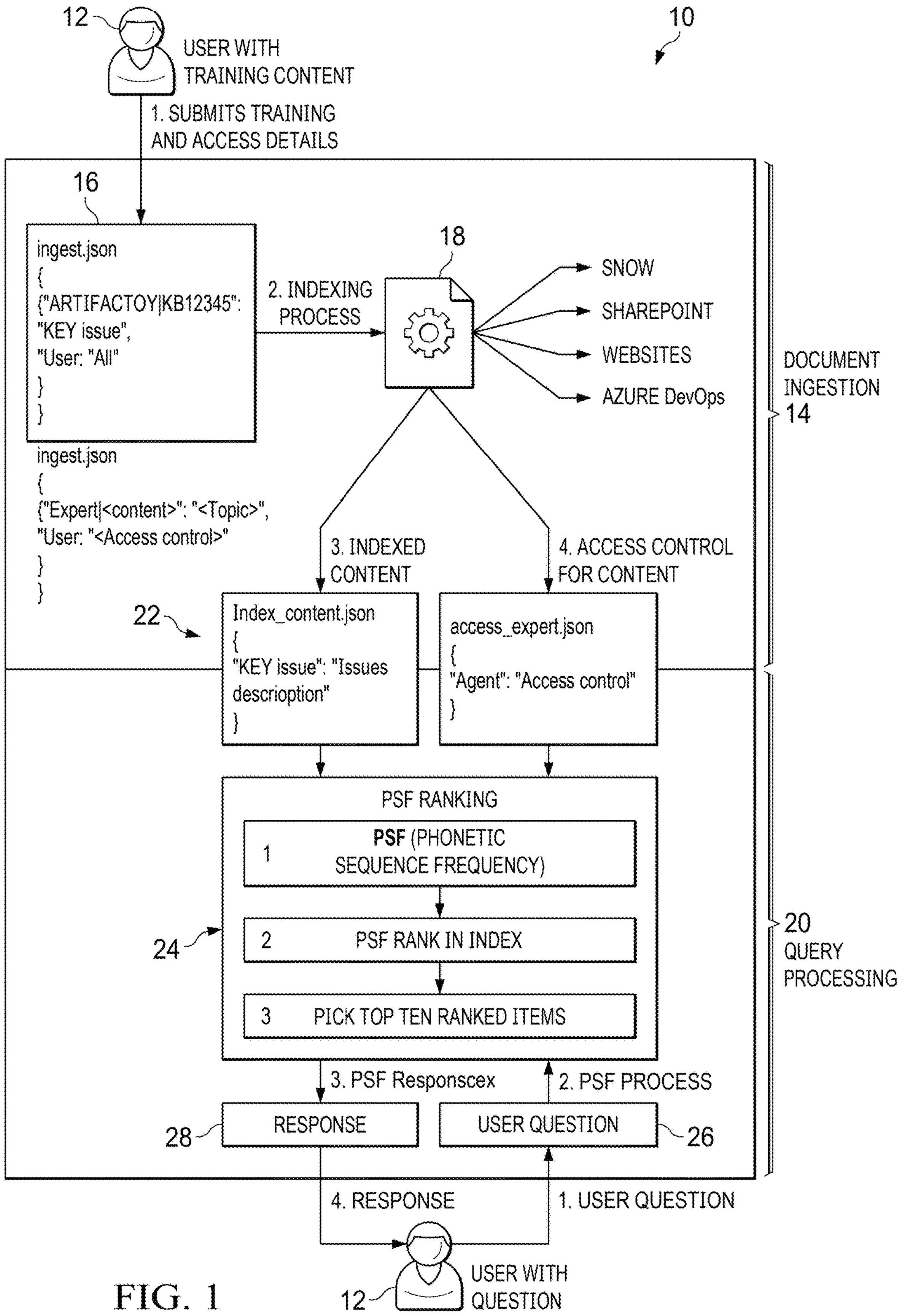
FIG. 1 is a schematic diagram illustrating an exemplary system and method for pre-processing AI queries, including an exemplary PSF subroutine.
Figure 2:
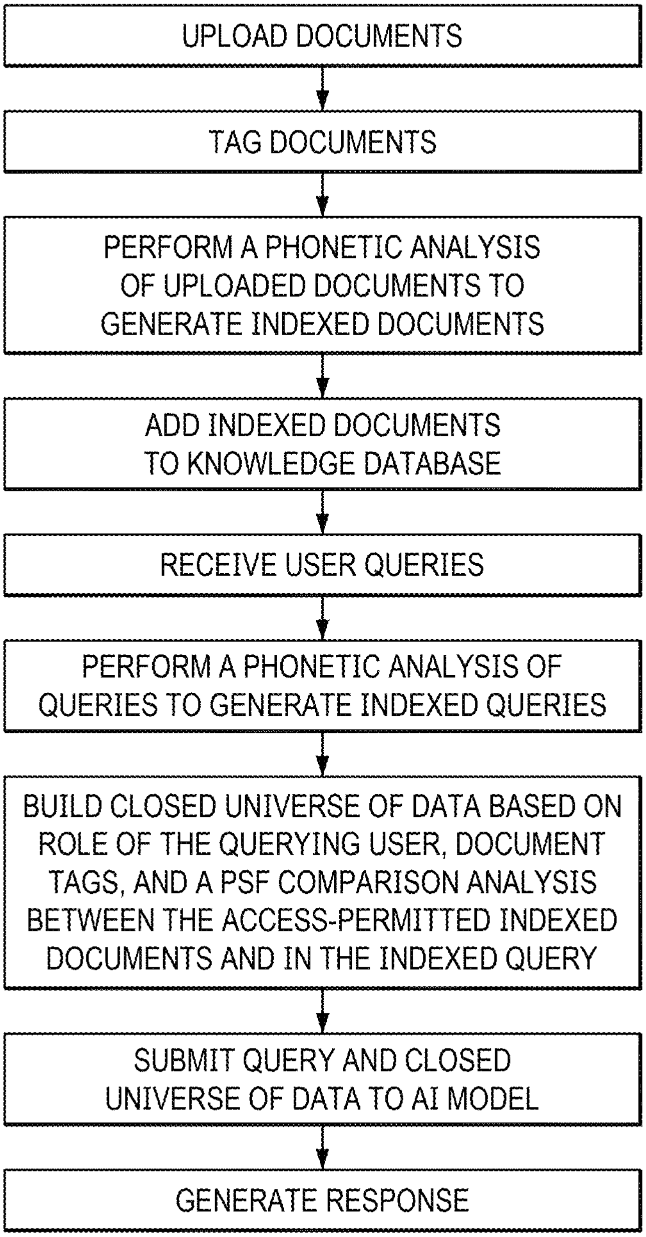
FIG. 2 is flow chart further detailing the method and/or use of the system of FIG. 1.

As illustrated with regard to FIG. 1 and FIG. 2, a system 10 for pre-processing AI queries. The system 10, and/or various components thereof, may comprise one or more software applications or programs and/or databases hosted at one or more servers or other non-transitory electronic storage devices, and/or executed, in whole or in part, on one or more computer devices, such as but not limited to, computers, laptops, tablets, servers, smartphones, combinations thereof, or the like.

The system 10 may include a document ingestion subsystem 14 and a query processing subsystem 20. The document ingestion subsystem 14 may be configured to receive documents uploaded by users 12. Documents may be uploaded from user 12 associated systems (e.g., computers, laptops, tablets, servers, smartphones, combinations thereof, or the like) to one or more databases of the system 10 for electronic storage. As used herein, "document" refers to various types, kinds, and/or formats of files and/or underlying data, such as but not limited to, word processing files, spreadsheet files, portable document format files, compressed files (e.g., .zip), slide deck files, combinations thereof, or the like. The system 10 may be configured to accept a wide variety of documents.

In exemplary embodiments, the document ingestion subsystem 14 may comprise a document ingestion subroutine 16. The document ingestion subroutine 16 may be configured to tag each of the uploaded documents, such as with a topic and/or intended audience tag. Tagging may be performed manually by the uploading user 12 in exemplary embodiments, without limitation. For example, without limitation, the system 10 may be configured to generate a prompt or other user interface object at the user's 12 system requesting that the user provide the tag(s).

In exemplary embodiments, without limitation, a list of available, candidate tags may be generated for the user 12 to select from. A field may be provided for the user 12 to create their own tag, such if none of the existing tags are perceived to be a good fit.

Alternatively, or additionally, the system 10 may be configured to perform the tagging in an at least partially automated fashion. For example, without limitation, a default audience tag may be assigned to any uploaded document corresponding with a known role of the uploading user 12. Each of the users 12 may be required to log into the system 10 for use, which may establish the user's 12 role. If the uploading user 12 is in a financial role, by way of non-limiting example, the document may be automatically tagged for a financial audience. Alternatively, or additionally, the uploaded document may be tagged based on the user's 12 role. Continuing with the aforementioned example, without limitation, the document may be automatically tagged as having a financial topic. These automatic tags may be applied by default, in exemplary, non-limiting embodiments, and may be manually adjusted by the users 12, for example.

The document ingestion subroutine 16 may, optionally, be configured to pre-process and/or further process the uploaded documents, such as by converting into various acceptable formats (e.g., a common format, such as json by way of non-limiting example) for storage, utilizing optical character recognition ("OCR") of submitted documents, re-sizing documents, combinations thereof, or the like, such as to extract data and/or format for efficient storage.

The system 10 may comprise an indexing subroutine 18 configured to index the submitted, tagged, and optionally process, documents for storage as part of a knowledge database. Indexing may be performed in accordance with some or all of the PSF subroutine 24 as further described herein, independently of, or in conjunction with, the tagging feature.

The same or different users 12 may submit queries 26 to the query processing subsystem 20. The queries 26 may be received by way of a chatbot interface generated at a system associated with the querying user 12 (e.g., computers, laptops, tablets, servers, smartphones, combinations thereof, or the like), though other types and kinds of interfaces may be utilized. In this way, the queries 26 may be provided as natural language queries 26, though other formats may be utilized.

The queries 26 may be received at, and processed by, the PSF subroutine 24, as further described herein. The PSF subroutine 24 may interact with the document ingestion subsystem 14 to create an index of query results. The PSF subroutine 24 may identify a selection of top results (e.g., number or percentage) from the indexed results for retrieval to create the closed universe of data for processing by an AI model 28. Alternatively, or additionally, the PSF subroutine 24 may be configured to cease creation of the index of results once a certain number of results are generated.

A query/retrieval subroutine 22 may be configured to retrieve the top ranked documents identified by the PSF subroutine 24. Where less than a predetermined number of documents are found, the PSF subroutine 24 may retrieve all resulting documents. The documents retrieved by the PSF subroutine 24 may form the closed universe of data for submission to the AI model 28 for further processing into a human interpretable summary or other desired output.

The AI model 28 may comprise a generative AI model, such as but not limited to a SLM. Any type of kind of AI model 28 may be utilized. The AI model 28 may process the user query 26, preferably using only the closed universe of data, and may provide a result to the querying user 12. The AI model 28 may be part of, or separate from, the system 10. The output may comprise a human interpretable summary of, and/or extraction from, the closed universe of data or other desired output and/'or format.

Optionally, the system 10, such as by way of the query/retrieval subroutine 22, may be configured to initially process the queries 26 by topic. For example, without limitation, the system 10 may be configured to initially process the query 26 to identify a relevant topic or topics such that the closed universe of documents and/or data consists of documents and/or data tagged with the topic(s). This may assist with access control and/or relevance of retrieved documents and/or data.

Alternatively, or additionally, the system 10, such as by way of the query/retrieval subroutine 22, may optionally be configured to initially process the queries 26 by audience. For example, without limitation, the system 10 may be configured to identify a role of the querying user 12 such that the closed universe of documents and/or data consists of documents and/or data tagged for an audience(s) matching that of the querying user 12. This may assist with access control and/or relevance of retrieved documents and/or data.

The various system 10 components, such as but not limited to, the document ingestion subroutine 16, indexing subroutine 18, query/retrieval subroutine 22, PSF subroutine 24, combinations thereof, and the like may be stored and/or hosted at one or more non-transitory electronic storage devices (e.g., computers, laptops, tablets, servers, smartphones, combinations thereof, or the like), such as those associated with the user 12 and/or separate therefrom. The various subroutines or other components of the system 10 may exist separately or together, such as stored at common storage media and/or as part of common programs or routines.

Figure 3:
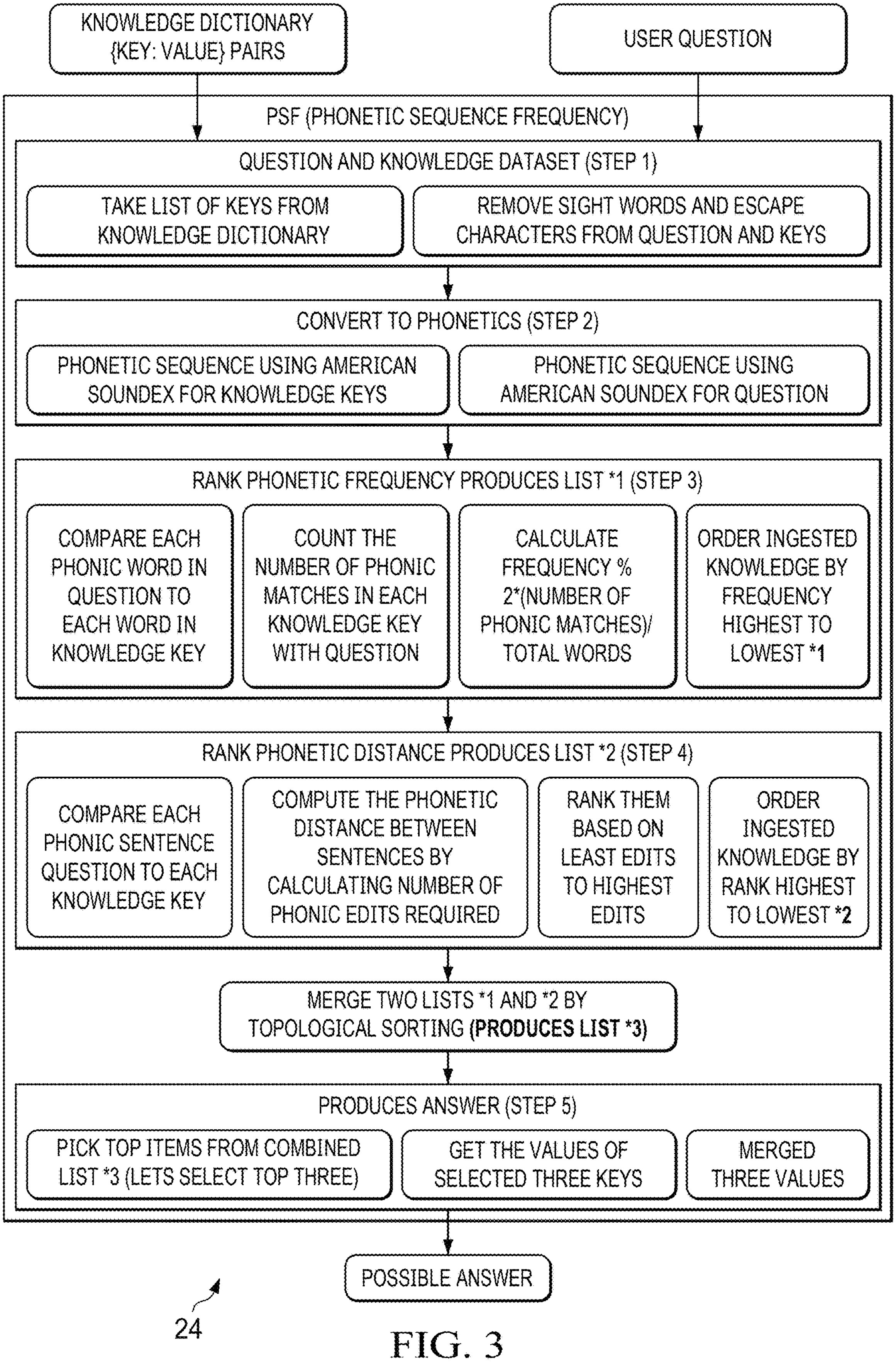
FIG. 3 is a flow chart further detailing the method of FIGS. 1-2 and/or use of the system of FIG. 1.
Figure 4A:
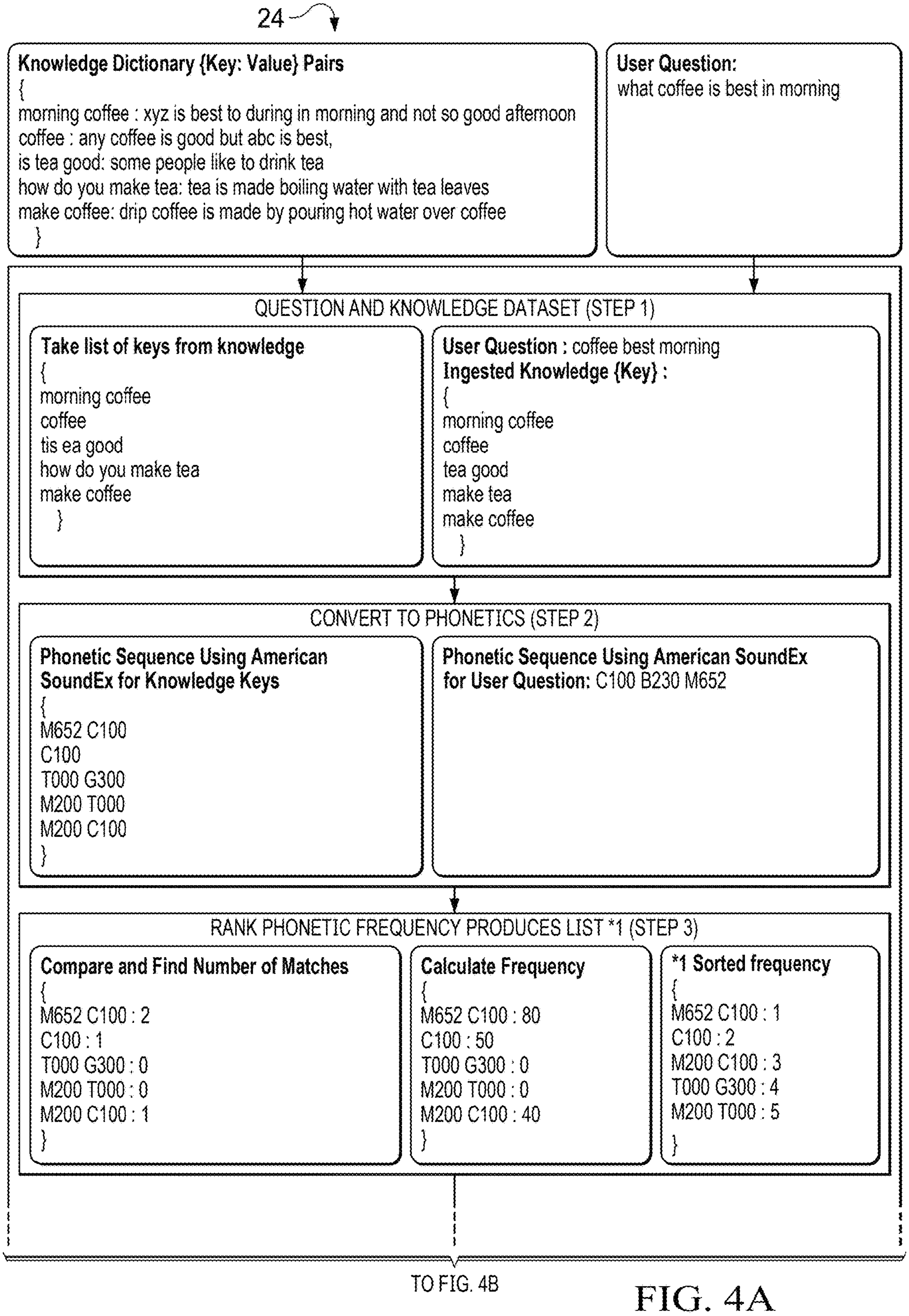
FIG. 4A is a portion of a flow chart illustrating an example use case of the method of FIG. 3.
Figure 4B:
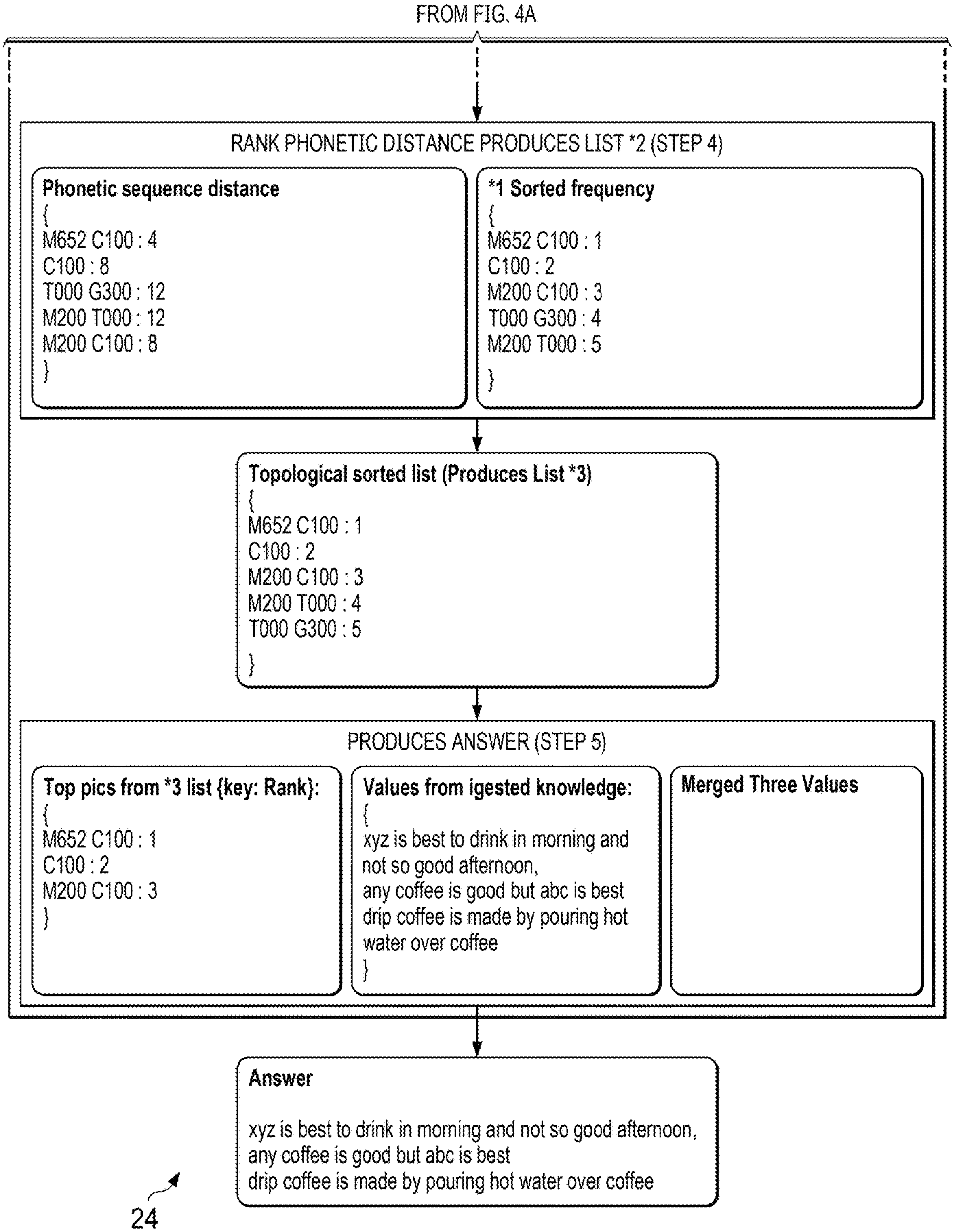
FIG. 4B is a continuation of the flow chart of FIG. 4A.

FIG. 3 further details operations of the PSF subroutine 24, including an analysis performed electronically and automatically when the PSF routine 24 is executed, and FIG. 4A through FIG. 4B provide a non-limiting use case example of the PSF subroutine 24 in operation. The PSF subroutine 24 may sometimes be referred to herein as the "PSF analysis".

At step 1, preprocessing, queries 26 and documents may be submitted. Tags, sometimes referenced to herein as "keys", to establish key-value pairs may be extracted from the knowledge database of submitted documents and the queries 26. This may provide a pre-populated list of candidate tags, for example.

Stop words and escape characters may be removed from the queries 26 and/or submitted documents and/or submitted documents. These cleaned sequences of words from the queries and/or documents may then be ready for phonetic conversion.

At step 2, phonetic conversion, the sequence of words from step 1 may be converted into phonetic codes, such as using the American Soundex system by way of non-limiting example. Other language, dialect, and/or systems of phonetic coding and/or interpretation may be utilized. Phonetic sequences corresponding to each word may be generated.

In exemplary embodiments, without limitation, steps 1 and/or 2 may be performed for each received document and/or user query. The performance of steps 1 and or 2 may sometimes be referred to herein as the "phonetic indexing subroutine". Steps 1 and or 2 may be utilized to generate phonetically indexed documents for the knowledge database and/or phonetically indexed user queries. Steps 1 and/or 2 may be the extent of the PSF subroutine 24 for each received document upon receipt, such as when building and/or adding to the knowledge database. Steps 1 and/or 2 may be the extent of the PSF subroutine 24 for each received query upon receipt, at least until comparing the query against the knowledge database by way of example. Further and/or different steps of the PSF subroutine 24, such as any one or more of steps 3-5 further described herein, may be performed when processing a respective query (e.g., comparing the respective query against the knowledge database), by way of example. Such steps (e.g., any one or more of steps 3-5) may be sometimes referred to herein as the "PSF comparison analysis" and/or "PSF comparison subroutine".

As step 3, phonetic comparison and frequency calculation, the phonetic codes derived from the user question may be compared with the phonetic codes extracted from the data in the knowledge database (e.g., knowledge key), such as on a document-by-document basis. The number of times matches occur may be counted by the PSF subroutine 24 which then calculates frequency, such as using equation 1, by way of non-limiting example.

$$\text{Frequency} = (2 \times N)/(K + Q) \qquad \text{Equation 1}$$

Where N is the number of phonetic matches, K is the total words in the key, and Q is the total number of words in the question. The frequency may, optionally, be expressed as a percentage. The step 3 output may include a list (L1), which is sorted by frequency from highest to lowest.

At step 4, calculating phonetic distance, the phonetic sequence from the user query may be compared with the phonetic sequences extracted from the data in the knowledge database (e.g., knowledge keys), such as on a document-by-document basis. The phonetic distance may be calculated, such as based on a number of edits required to match the query with the knowledge keys, and results ranked from closest to farthest, such as on a document-by-document basis. In exemplary embodiments, without limitation, a Levenshtein distance technique may be utilized to determine the phonetic distance. The step 4 output may include a list (L2), which is sorted by phonetic distance.

At step 5, merging and final sorting, lists L1 and L2 are merged, such as by using a topological sorting to prioritize both frequency and closeness of phonetic matches. A merged list, L3, may be generated, such as from the topological sorting. The closed universe documents may be selected from L3. In exemplary embodiments, a top number ("n") of documents are retrieved and/or selected from L3 to generate the closed universe.

The values (e.g., documents, data) corresponding to the n documents may be retrieved and sent to the AI model 28. The values may, optionally, be merged into a single file or document prior to sending. The AI model 28 may be configured to summarize the data, extract a particular data point, synthesize some or all of the data, and/or otherwise generate a single, coherent response text based on, and in response to, the query 26 and derived, preferably solely, from analysis of the closed universe of data by the AI model 28. A wide variety of formats of the generated output may be utilized.

In exemplary embodiments, without limitation, the average response time for a knowledge database with 1000 key-value pairs will range between 70-300 ms, thereby demonstrating significant efficiency in compute time processing.

The following listing of exemplary embodiments is made by way of example and without limitation.

A1. A computer-implemented method for pre-processing artificial intelligence ("AI") queries, said method comprising:

receiving documents from users to build a knowledge database;

receiving a user queries;

for each of the user queries:

building a closed universe of data, where the closed universe of data consists of a subset of the documents; and providing the closed universe of data to a generative AI model for generating a response to the user query based on the closed universe of data.

A2. The method of embodiment A wherein: the AI model is provided with only the closed universe of data and the user query, and generates the response based only on closed universe of data and the user query.

A3. The method of any one of embodiments A1 and A2 further comprising:

tagging each of the received documents with an audience identifier; and for each of the user queries, identifying a role of the querying user, and restricting the closed universe to data from the received documents tagged with one of the audience identifiers matching the identified role of the querying user.

A3. The method of claim A3 further comprising:

tagging each of the received documents with a topic identifier;

for each of the user queries, identifying a topic of the query, and restricting the closed universe to data from the received documents tagged with one of the topic identifiers matching the identified topic of the query.

A5. The method of embodiment A4 wherein:

each of the audience identifiers is selected from a plurality of candidate audience identifiers; and each of the topic identifiers is selected from a plurality of candidate topic identifiers.

A6. The method of any one of embodiments A1-A5 further comprising:

generating, by way of the generative AI model, results from the closed universe of data; and transmitting the results to the querying user.

A7. The method of embodiment A6 wherein: the generative A1 mode is a small language model.

A8. The method of claim embodiment A6 further comprising:

generating, at devices associated with the querying users, a chatbot interface for receiving the queries; and providing the results at the chatbot interface.

A9. The method of any one of embodiments A1-A8 further comprising:

building the knowledge database comprises processing each of the received documents through a phonetic sequence frequency ("PSF") analysis; and building the closed universe of data for generating the response comprises processing each of the queries through the PSF analysis.

A10. The method of embodiment A9 wherein:

the PSF analysis comprises:

preprocessing the queries and received documents, including by removing stopwords and escape characters;

processing the preprocessed queries and documents using a soundex;

comparing each word in the query to each word in the knowledge database, counting the number of phonetic matches in each of the documents with those of the query, calculating a frequency of matches, and ordering the document by the frequency of matches to generate a first list of results.

A11. The method of embodiment A10 wherein: calculating the frequency of matches comprises multiplying the quotient of the number of phonetic matches in each of the documents with those of the query and the total number of words in the document by two and expressing the result as a percentage.

A12. The method of embodiment A10 further comprising: comparing each phonetic sentence in the query to each phonetic sentence in the knowledge database, determining a phonetic distance between each of the phonetic sentences in the query and each of the phonetic sentence in the knowledge database by calculating a number of phonetic edits required to match the sentences, and ordering the sentences by number of edits to generate a second list of results.

A13. The method of embodiment A12 further comprising:

merging the first list of results with the second lists of results by topological sorting to generate a third list of results;

selecting a predetermined number of highest-ranked ones of the documents from the third list of results;

providing the predetermined number of highest-ranked ones of the documents as the closed universe.

A14. The method of embodiment A13 further comprising: aggregating the predetermined number of highest-ranked ones of the documents into a single document for provision to the generative AI model.

A15. The method of embodiment A13 wherein: the predetermined number of highest-ranked ones of the documents comprises a fixed number.

A16. The method of embodiment A1 further comprising providing the documents in a plurality of formats; and converting the documents into a common format for storage at the knowledge database.

B1. A computer-implemented method for processing artificial intelligence ("AI") queries, said method comprising:

building a knowledge database comprising:

receiving documents from users to build the knowledge database;

tagging each of the received documents with at least one of: an audience identifier and a topic identifier; and processing each of the received documents through a phonetic sequence frequency ("PSF") subroutine to index the knowledge database;

receiving user queries, and for each of the user queries:

identifying at least one of: a role of the querying user and a topic of the query;

processing each of the queries through the PSF subroutine to build a closed universe of data of top ranked documents from the indexed knowledge database for generating a response, where the closed universe of data consists of a subset of the top ranked ones of the documents comprising documents tagged with the one of the audience identifiers and the topic identifiers matching the one of the role of the querying user and the topic identifiers matching the topic of the query;

providing the closed universe of data to a generative AI model;

generating, by way of the generative AI model, results from the closed universe of data; and transmitting the results to the querying user.

B2. The method of embodiment B1 wherein:

the PSF subroutine comprises:

preprocessing the queries and received documents, including by removing stopwords and escape characters;

processing the preprocessed queries and documents using a soundex;

comparing each word in the query to each word in the knowledge database, counting the number of phonetic matches in each of the documents with those of the query, calculating a frequency of matches, and ordering the document by the frequency of matches to generate a first list of results;

comparing each phonetic sentence in the query to each phonetic sentence in the knowledge database, determining a phonetic distance between each of the phonetic sentences in the query and each of the phonetic sentence in the knowledge database by calculating a number of phonetic edits required to match the sentences, and ordering the sentences by number of edits to generate a second list of results;

merging the first list of results with the second lists of results by topological sorting to generate a third list of results;

selecting a predetermined number of highest-ranked ones of the documents from the third list of results; and providing the predetermined number of highest-ranked ones of the documents as the closed universe.

C1. A computer-implemented method for processing artificial intelligence ("AI") queries, said method comprising:

building a knowledge database comprising:

receiving documents from users to build the knowledge database;

tagging each of the received documents with an audience identifier and a topic identifier; and processing each of the received documents through a phonetic sequence frequency ("PSF") subroutine;

receiving user queries, where said queries comprise natural language queries provided by way of a chatbot interface, and for each of the user queries:

identifying a role of the querying user;

identifying a topic of the query;

processing each of the queries through the PSF subroutine to build a closed universe of data for generating a response, where the closed universe of data consists of a subset of the documents comprising documents tagged with one of the audience identifiers matching the identified role of the querying user and one of the topic identifiers matching the identified topic of the query;

providing the closed universe of data to a small language generative A1 model;

generating, by way of the small language generative AI model, results from the closed universe of data; and transmitting the results to the querying user for display at the chatbot interface.

C2. The method of embodiment C1 wherein:

the PSF subroutine comprises:

preprocessing the queries and received documents, including by removing stopwords and escape characters;

processing the queries and received documents, including by processing the preprocessed queries and documents using an American soundex;

comparing each word in the query to each word in the knowledge database, counting the number of phonetic matches in each of the documents with those of the query, calculating a frequency of matches, and ordering the document by the frequency of matches to generate a first list of results;

comparing each phonetic sentence in the query to each phonetic sentence in the knowledge database, determining a phonetic distance between each of the phonetic sentences in the query and each of the phonetic sentence in the knowledge database by calculating a number of phonetic edits required to match the sentences, and ordering the sentences by number of edits to generate a second list of results;

merging the first list of results with the second lists of results by topological sorting to generate a third list of results;

selecting a predetermined number of highest-ranked ones of the documents from the third list of results; and providing the predetermined number of highest-ranked ones of the documents as the closed universe.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphones, tablets, databases, servers, or the like. The electronic connections and transmissions described herein may be accomplished by one or more wired or wireless connectivity components (e.g., routers, modems, ethernet cables, fiber optic cable, telephone cables, signal repeaters, and the like) and/or networks (e.g., internets, intranets, cellular networks, the world wide web, local area networks, and the like). The computerized hardware, software, components, systems, steps, methods, and/or processes described herein may serve to improve the speed of the computerized hardware, software, systems, steps, methods, and/or processes described herein. The electronic devices, including but not necessarily limited to the electronic storage devices, databases, controllers, or the like, may comprise and/or be configured to hold, solely non-transitory signals.

What is claimed is:

1. A computer-implemented method for processing and/or pre-processing queries, said method comprising:

performing a phonetic indexing subroutine for each of a plurality of received documents from users to generate phonetically indexed documents, said phonetically indexed documents forming, at least in part, a knowledge database; and for each of a plurality of received user queries:

performing the phonetic indexing subroutine for the respective query to generate a respective indexed query;

performing a phonetic sequence frequency ("PSF") comparison analysis for the respective indexed query against some or all of the indexed documents in the knowledge database based, at least in part, on a phonetic sequence and frequency comparison between each phonetic word in the respective indexed query and each phonetic word in the compared documents, wherein the PSF comparison analysis comprises:

generating a first ranked list of results by comparing, on a document-by-document basis for each of the compared documents, each phonetic word in the respective indexed query to each phonetic word in the respective compared document, counting a number of phonetic matches between the respective indexed query and the respective compared document, calculating a frequency of the phonetic matches for each respective compared document, and ordering the compared documents by the frequency of the phonetic matches;

generating a second ranked list of results by comparing each phonetic sentence in the respective indexed query to each phonetic sentence of the compared documents, calculating a number of phonetic edits required to match the phonetic sentences, and ordering the compared documents by the number of phonetic edits; and merging the first ranked list of results with the second ranked list of results by topological sorting to generate a third ranked list of results; and identifying, based on the PSF comparison analysis, a subset of the compared documents for use in generating a response to the respective user query, where identifying the subset of the compared documents includes selecting a predetermined number or percentage of highest ranked one or ones of the indexed documents in the third ranked list of results, which is less than all of the compared documents in the third ranked list of results:

providing the subset of the compared documents to a generative language model for analysis and response generation for the respective user query.

2. The method of claim 1 wherein:

the phonetic sequence and frequency comparison includes, on a document-by-document basis for each of the compared documents, determining a number of edits required to match a sequence of phonetic words in the respective query with a sequence of phonetic words in the respective document, wherein the number of edits is used, at least in part, to determine the ranking of the compared documents.

3. The method of claim 1 wherein:

the generative language model is provided with only the subset of the compared documents to generate the response such that the response from the generative language model is derived solely based on the subset of the compared documents.

4. The method of claim 1 wherein:

the respective user query is received by way of a chat-bot interface generated at a user system; and the response is generated at the chat-bot interface at the user system.

5. The method of claim 1 further comprising:

tagging each of the received documents with an audience identifier such that each of the documents is associated with a respective audience identifier, wherein each audience identifier is associated with one or more roles; and for each of the user queries, identifying a role of the querying user, and restricting the PSF comparison analysis to the indexed documents tagged with one of the audience identifiers associated with the identified role of the querying user.

6. The method of claim 5 wherein:

each of the audience identifiers is selected from a plurality of candidate audience identifiers;

each of the roles is selected from a plurality of candidate roles; and the candidate roles correspond with the audience identifiers on a one-to-one basis.

7. The method of claim 1 further comprising:

tagging each of the received documents with a topic identifier such that each of the indexed documents is associated with a respective topic identifier, wherein each topic identifier is associated with one or more roles; and for each of the user queries, identifying a role of the querying user, and restricting the PSF comparison analysis to the indexed documents tagged with one of the topic identifiers associated with the identified role of the querying user.

8. The method of claim 7 wherein:

each of the topic identifiers is selected from a plurality of candidate topic identifiers; and at least some of the topic identifiers are associated with a plurality of the roles.

9. The method of claim 1 wherein:

the phonetic indexing subroutine for the received documents comprises:

removing stopwords and escape characters to generate preprocessed documents; and indexing the preprocessed documents using a soundex; and the phonetic indexing subroutine for the user queries comprise:

removing stopwords and escape characters to generate preprocessed queries; and indexing the preprocessed queries using a soundex.

10. The method of claim 1 wherein:

the frequency of the phonetic matches for each respective compared document is calculated according to the formula $F=(2\times N)/(K+Q)$, where N is the number of phonetic matches, K is the total number of phonetic words in the respective compared document, and Q is the total number of phonetic words in the respective indexed query.

11. The method of claim 1 wherein:
the number of phonetic edits required to match the phonetic sentences is calculated using a Levenshtein distance technique.

12. The method of claim 1 wherein:
the generative language model comprises a small language model trained on a corpus smaller than that of a general-purpose large language model.

13. A computer-implemented method for document ingestion in a retrieval augmented generation system for generative language models, said method comprising:
receiving a plurality of documents;
tagging each of the received documents with a topic identifier and audience identifier;
performing a phonetic indexing subroutine of each of the received documents to generate indexed documents derived from content of the documents;
storing the indexed documents in a data repository with access controls and in association with the respective topic identifier and audience identifier with which the received document was tagged;
receiving a plurality of user queries;
performing the phonetic indexing subroutine for each of the plurality of user queries to generate indexed queries;
performing a phonetic sequence frequency ("PSF") comparison analysis of each of the user queries against some or all of the indexed documents in the data repository based, at least in part, on a phonetic sequence and frequency comparison between each phonetic word in the respective indexed query and each phonetic word in the compared documents, wherein the PSF comparison analysis comprises:
generating a first ranked list of results by comparing, on a document-by-document basis for each of the compared documents, each phonetic word in the respective indexed query to each phonetic word in the respective compared document, counting a number of phonetic matches between the respective indexed query and the respective compared document, calculating a frequency of the phonetic matches for each respective compared document, and ordering the compared documents by the frequency of the phonetic matches;
generating a second ranked list of results by comparing each phonetic sentence in the respective indexed query to each phonetic sentence of the compared documents, calculating a number of phonetic edits required to match the phonetic sentences, and ordering the compared documents by the number of phonetic edits; and
merging the first ranked list of results with the second ranked list of results by topological sorting to generate a third ranked list of results;
identifying, for each of the user queries and based on the respective PSF comparison analysis, a subset of the compared documents for use in generating a response to the respective user query ("closed universe of data"), where identifying the subset of the compared documents includes
selecting a predetermined number or percentage of highest ranked one or ones of the indexed documents in the third ranked list of results, which is less than all of the ranked documents in the third ranked list of results; and
providing, for each of the user queries, the respective closed universe of data to a generative language model for analysis and response generation based on the respective user query.

14. The method of claim 13 further comprising
providing the documents in a plurality of formats; and
converting the documents into a common format for storage at the data repository; and
updating indices as new documents are added to the data repository.

15. A computer-implemented method for augmenting inputs along with queries to generative language models ("LM") using phonetic sequence frequency ("PSF") analysis to improve accuracy of LM query results, said method comprising:
building a knowledge database comprising:
receiving documents from users to build the knowledge database;
tagging each of the received documents with at least one of: an audience identifier and a topic identifier; and
processing each of the received documents through a phonetic indexing subroutine to index the knowledge database;
receiving user queries, and for each of the user queries:
identifying at least one of: a role of the querying user and a topic of the query;
processing each of the queries through a PSF subroutine to build a closed universe of data of top ranked documents from the indexed knowledge database for generating a response, said PSF subroutine including:
performing the phonetic indexing subroutine for each of the queries;
performing a PSF comparison analysis for the respective indexed query against some or all of the indexed documents in the knowledge database based, at least in part, on a phonetic sequence and frequency comparison between each phonetic word in the respective indexed query and each phonetic word in the compared documents, wherein the PSF comparison analysis comprises:
generating a first ranked list of results by comparing, on a document-by-document basis for each of the compared documents, each phonetic word in the respective indexed query to each phonetic word in the respective compared document, counting a number of phonetic matches between the respective indexed query and the respective compared document, calculating frequency of the phonetic matches for each respective compared document, and ordering the compared documents by the frequency of the phonetic matches;
generating a second ranked list of results by comparing each phonetic sentence in the respective indexed query to each phonetic sentence of the compared documents, calculating a number of phonetic edits required to match the phonetic sentences, and ordering the compared documents by the number of phonetic edits; and
merging the first ranked list of results with the second ranked list of results by topological sorting to generate a third ranked list of results; and; and
identifying, based on the PSF comparison analysis, a subset of the compared documents for inclusion in the respective closed universe of data, where identifying the subset of the compared documents includes:

restricting the subset of the compared documents to documents tagged with an audience identifier and a topic identifier corresponding to the role of the querying user and the topic of the query, respectively;

selecting a predetermined number or percentage of highest ranked one or ones of the indexed documents in the third ranked list of results, which is less than all of the ranked documents in the third ranked list of results;

providing the closed universe of data to the LM;

generating, by way of the LM, a response to the query based on the closed universe of data; and transmitting the results to the querying user.

* * * * *